United States Patent
Zhu et al.

(10) Patent No.: US 12,012,558 B1
(45) Date of Patent: Jun. 18, 2024

(54) MICROCHANNEL REACTORS FOR CATALYTIC OXIDATION OF HYDROCARBON FUELS

(71) Applicant: Saudi Arabian Oil Company, Dhahran (SA)

(72) Inventors: Guanghui Zhu, Dhahran (SA); Maryam M. Al-Taher, Dammam (SA); Christos Kalamaras, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/065,961

(22) Filed: Dec. 14, 2022

(51) Int. Cl.
*C10G 27/04* (2006.01)
*B01J 12/00* (2006.01)
(Continued)

(52) U.S. Cl.
CPC ............ *C10G 27/04* (2013.01); *B01J 12/007* (2013.01); *B01J 19/0093* (2013.01);
(Continued)

(58) Field of Classification Search
CPC .............. C10G 27/04; C10G 2300/307; C10G 2300/4006; C10G 2300/4012; C10G 2300/4018; C10G 2300/4081; C10G 2300/70; C10G 2400/02; B01J 12/007; B01J 19/0093; B01J 31/0247; B01J 2219/00835; B01J 2219/0086; B01J 2219/00867; B01J 2219/00869;
(Continued)

(56) References Cited

U.S. PATENT DOCUMENTS 2,767,123 A   10/1956   Hickok et al.
7,226,574 B2   6/2007   Long et al.
(Continued)

FOREIGN PATENT DOCUMENTS

JP          4776246 B2 *  9/2011
WO    WO-2008150451 A2 * 12/2008   .......... B01J 19/0093

OTHER PUBLICATIONS

Kunio et al. (JP4776246; Sep. 2011) (Year: 2011).*
(Continued)

*Primary Examiner* — Ellen M McAvoy
*Assistant Examiner* — Chantel Graham
(74) *Attorney, Agent, or Firm* — DINSMORE & SHOHL LLP (57) ABSTRACT

The present disclosure is directed to systems and methods for reforming a hydrocarbon fuel to increase the cetane value of the hydrocarbon fuel. The system includes a microstatic mixer and a microchannel reactor downstream of the microstatic mixer. The microchannel reactor includes a microchannel with an NHPI catalyst coated onto the walls of the microchannel. A hydrocarbon fuel and an oxygen-containing gas are combined and mixed in the microstatic mixer to produce a combined stream and the combined stream is passed through the microchannel. The microchannel reactor includes a heat transfer system. The hydrocarbon fuel and oxygen-containing gas are contacted in the microchannel in the presence of the catalyst at a reaction temperature sufficient to produce a reformed hydrocarbon fuel having a cetane value greater than a cetane value of the starting hydrocarbon fuel.

20 Claims, 8 Drawing Sheets

(51) Int. Cl.
*B01J 19/00* (2006.01)
*B01J 31/02* (2006.01)
(52) U.S. Cl.
CPC .. *B01J 31/0247* (2013.01); *B01J 2219/00835* (2013.01); *B01J 2219/0086* (2013.01); *B01J 2219/00867* (2013.01); *B01J 2219/00869* (2013.01); *B01J 2219/00873* (2013.01); *B01J 2219/00889* (2013.01); *B01J 2219/00905* (2013.01); *C10G 2300/307* (2013.01); *C10G 2300/4006* (2013.01); *C10G 2300/4012* (2013.01); *C10G 2300/4018* (2013.01); *C10G 2300/4081* (2013.01); *C10G 2300/70* (2013.01); *C10G 2400/02* (2013.01)
(58) Field of Classification Search
CPC .... B01J 2219/00873; B01J 2219/00889; B01J 2219/00905
See application file for complete search history.

(56) References Cited

U.S. PATENT DOCUMENTS

| | | |
|---|---|---|
| 7,294,734 B2 | 11/2007 | Brophy et al. |
| 8,383,872 B2 | 2/2013 | Tonkovich et al. |
| 9,835,117 B2 | 12/2017 | Hashimoto |
| 11,028,805 B2 | 6/2021 | Hamad et al. |
| 2016/0333286 A1 | 11/2016 | Kudo et al. |
| 2019/0170046 A1* | 6/2019 | Hamad ...................... F01N 3/36 |
| 2022/0235729 A1 | 7/2022 | Hashimoto et al. |

OTHER PUBLICATIONS

Al-Taher et al., "Aerobic oxidation of hydrocarbons using N-hydroxyphthalimide (NHPI) catalysts for cetane enhancement", Fuel, vol. 324, 124563, 7 pages, 2022.

Hermans et al., "Silica-immobilized N-hydroxyphthalimide: An efficient heterogeneous autoxidation catalyst", Journal of Catalysis, vol. 251, pp. 204-212, 2007.

Tan et al., "Conjugated copper(II) porphyrin polymer and N-hydroxyphthalimide as effective catalysts for selective oxidation of cyclohexylbenzene", Catalysius Communications, vol. 94, pp. 60-64, 2017.

Toribio et al., "Ethylbenzene oxidation to its hydroperoxide in the presence of N-hydroxyimides and minute amounts of sodium hydroxide", Applied Catalysis A: General, vol. 363, pp. 32-39, 2009.

Notification of Transmittal of the International Search Report and the Written Opinion of the International Searching Authority, or the Declaration dated Apr. 8, 2024 pertaining to International application No. PCT/US2023/083779 filed Dec. 13, 2023, pp. 1-11.

* cited by examiner

MICROCHANNEL REACTORS FOR CATALYTIC OXIDATION OF HYDROCARBON FUELS

BACKGROUND

Field

The present disclosure relates to systems and methods for reforming hydrocarbon fuels.

Technical Background

Conventional gasoline engines use spark ignition to ignite the gasoline and create combustion. In gasoline compression ignition (GCI) engines, the compression of the engine itself creates combustion in the same way a diesel engine creates combustion and in lieu of the spark of a spark ignition gasoline engine. The cetane value of a hydrocarbon fuel provides an indication of the ignition quality of the hydrocarbon fuel. Hydrocarbon fuels with higher cetane value undergo faster combustion of the hydrocarbon fuel after ignition, which makes the hydrocarbon fuel better suited for gasoline compression ignition engines compared to fuels with lower cetane value. GCI engines generally have better thermal efficiency compared to spark ignition engines and lower emissions compared to diesel compression ignition engines.

SUMMARY

Conventionally-available gasoline is not well-suited for gasoline compression ignition (GCI) engines compared to spark ignition engines, due to the cetane value of the conventionally-available gasoline. The drawbacks of conventionally-available gasoline are most apparent when GCI engines operate in high stress situations, such as but not limited to cold temperature starting procedures or high engine load conditions. Diesel fuel is well-suited for compression ignition engines, but diesel fuel produces greater emissions compared to combustion of gasoline in gasoline engines. One of the main features of diesel fuel that makes it suitable for compression engines is the diesel fuel's higher cetane value compared to gasoline.

Hydrocarbon fuels, such as but not limited to gasoline, may be upgraded through the use of catalysts to produce reformed hydrocarbon fuel with a greater cetane number. However, the worldwide increasing demand for upgraded hydrocarbon fuels remains a challenge. Typical methods for reforming hydrocarbon fuel involve a batch mode reactor with a solid particulate catalyst, the hydrocarbon fuel in the liquid phase, and oxygen in the gas phase. Such batch mode reactor methods require long reaction times, high temperatures, and constant monitoring. These batch mode reactors also require separation of the solid particulate catalyst from the reaction mixture. Therefore, an ongoing need exists for systems and processes to increase the cetane value of gasoline to improve the performance of GCI engines.

The systems and processes of the present disclosure can reform hydrocarbon fuel, such as but not limited to gasoline, to increase the hydrocarbon fuel's cetane value using a fixed catalyst system. The systems of the present disclosure for reforming a hydrocarbon fuel may include a microchannel reactor comprising a reforming catalyst coated onto the walls of the microchannel reactor and a microstatic mixer upstream of the microchannel reactor. The system may be operable to combine separate flows of hydrocarbon fuel and oxygen-containing gas into a combined flow in the microstatic mixer. The combined flow may be passed to and through the microchannel reactor. The microchannel can be kept at a proper reaction temperature by a heat transfer system. In the microchannel reactor, the hydrocarbon fuel and the oxygen-containing gas are contacted in the presence of the reforming catalyst to produce a reformed hydrocarbon fuel having greater cetane value compared to the starting hydrocarbon fuel.

According to at least one aspect of the present disclosure, a system for reforming a hydrocarbon fuel may comprise a microchannel reactor comprising a microchannel, where the microchannel may have a microchannel inlet, a microchannel outlet, at least one wall, and a catalyst deposited on the at least one wall of the microchannel. The at least one wall may define an interior cavity. The catalyst may comprise N-Hydroxyphthalimide (NHPI). The system may further include a heat transfer system configured to actively transfer heat across the at least one wall of the microchannel and a microstatic mixer upstream of the microchannel. The microstatic mixer may have a microstatic mixer inlet and microstatic mixer outlet, the microstatic mixer outlet may be in fluid communication with the microchannel inlet, and the microstatic mixer inlet may be fluidly coupled to a hydrocarbon fuel source and an oxygen containing gas source.

According to at least another aspect of the present disclosure a process for increasing a cetane value of a hydrocarbon fuel may comprise passing the hydrocarbon fuel and an oxygen-containing gas to a microstatic mixer that mixes the hydrocarbon fuel and the oxygen-containing gas to produce a combined stream and passing the combined stream to a microchannel reactor comprising a microchannel defined by at least one wall. The at least one wall may comprise a catalyst coated on a surface of the at least one wall, where the catalyst may comprise NHPI. The process may further include heating the microchannel to a reaction temperature and contacting the hydrocarbon fuel with the oxygen-containing gas in the presence of the catalyst in the microchannel at the reaction temperature. The contacting may cause at least a portion of hydrocarbons in the hydrocarbon fuel to react to produce a microchannel reactor effluent comprising a reformed hydrocarbon fuel having a cetane value greater than a cetane value of the hydrocarbon fuel upstream of the microchannel reactor.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of the present disclosure may be better understood when read in conjunction with the following drawings in which.

Reference will now be made in greater detail to various embodiments of the present disclosure, some embodiments of which are illustrated in the accompanying drawings. Whenever possible, the same reference numerals will be used throughout the drawings to refer to the same or similar parts.

DETAILED DESCRIPTION

Figure 1:
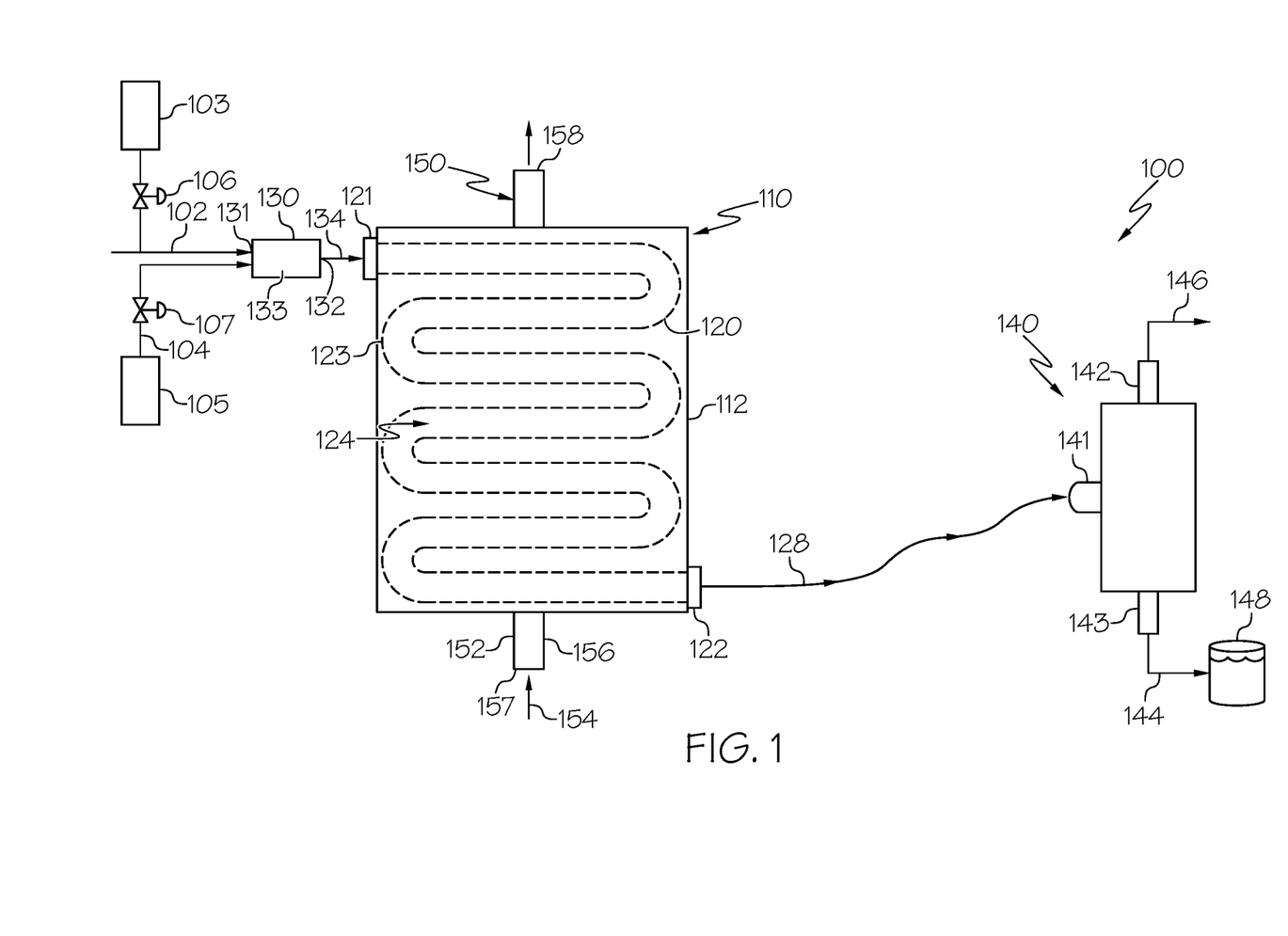
FIG. 1 schematically depicts a system comprising a microchannel reactor for reforming a liquid hydrocarbon fuel, according to embodiments shown and described in the present disclosure.

Embodiments of the present disclosure are described in the detailed description, which follows. The present disclosure may be directed to systems, processes, and methods for reforming liquid hydrocarbon fuel to produce reformed liquid hydrocarbon fuel having a greater cetane number compared to the liquid hydrocarbon fuel before reforming. Referring now to FIG. 1, one embodiments of a system 100 for reforming a hydrocarbon fuel 102 is schematically depicted. The system 100 may include a microchannel reactor 110 comprising a microchannel 120, where the microchannel 120 has a microchannel inlet 121, a microchannel outlet 122, at least one wall 123, and a catalyst deposited on the at least one wall 123 of the microchannel 120. The at least one wall 123 may define an interior cavity of the microchannel 120, and the catalyst may comprise N-Hydroxyphthalimide (NHPI). The system 100 may further include a heat transfer system 150 configured to actively transfer heat across the at least one wall 123 of the microchannel 120. The system 100 may further include a microstatic mixer 130 upstream of the microchannel reactor 110. The microstatic mixer 130 may have a microstatic mixer inlet 131 and microstatic mixer outlet 132. The microstatic mixer outlet may be in fluid communication with the microchannel inlet 121, and the microstatic mixer inlet 131 may be fluidly coupled to a hydrocarbon fuel source 103 and an oxygen containing gas source 105.

The system 100 combines separate flows of a hydrocarbon fuel 102 and an oxygen-containing gas 104 in the microstatic mixer 130 to produce a combined stream 134. The combined stream 134 is then passed through the microchannel 120 of the microchannel reactor 110, where the combined stream 134 is heated by a heat transfer system 150. A catalyst is coated onto the walls 123 of the microchannel 120. In the microchannel 120, the hydrocarbon fuel and oxygen-containing gas are contacted in the presence of the catalyst. The contacting causes oxidation of the hydrocarbon fuel to produce a microchannel reactor effluent 128 that contains reformed hydrocarbon fuel having a cetane value greater than the cetane value of the hydrocarbon fuel. The present systems and methods provide an efficient process for increasing the cetane value of gasoline to improve the suitability for use in GCI engines compared to non-reformed gasoline.

As used throughout the present disclosure, "cetane number" refers to the derived cetane number (DCN) of gasoline fuel (liquid hydrocarbon) which was calculated using the ignition delay (ms) measured by ignition quality tester (IQT) analyzer according to the ASTM D6890-21.

As used throughout the present disclosure, the terms "upstream" and "downstream" refer to the relative positioning of unit operations with respect to the direction of flow of the process streams. A first unit operation of a system may be considered "upstream" of a second unit operation if process streams flowing through the system encounter the first unit operation before encountering the second unit operation. Likewise, a second unit operation may be considered "downstream" of the first unit operation if the process streams flowing through the system encounter the first unit operation before encountering the second unit operation.

Spark ignition engines are internal combustion engines that utilize a spark plug to ignite a mixture of a fuel and air. In contrast, compression ignition engines work by igniting liquid hydrocarbon fuel with compressed hot air, eliminating the need for a spark plug. Spark ignition engines have low efficiency and low power output when compared to compression ignition engines; compression ignition engines produce more power due to a high compression ratio. However, compression ignition engines are sometimes difficult to operate in low-temperature cold starts. During low temperature, cold start, a compression ignition engine may fail to burn all of the liquid hydrocarbon fuel, resulting in increased contaminant emissions, lower efficiency, and lower power output. Thus, there is an ongoing need for liquid hydrocarbon fuels that have greater cetane value and that are capable of burning fully in low temperature conditions in compression ignition engines during cold start.

On one hand, the burning of liquid hydrocarbon fuel with a low cetane number in compression ignition engines can result in increased emissions, low efficiency, and low power output. This may be due to longer ignition delays and, thus, less time for the combustion process to be completed when the liquid hydrocarbon fuel with a low cetane number is utilized by a compression ignition engine. On the other hand, use of liquid hydrocarbon fuel having high cetane number can provide shorter ignition delays, resulting in a more complete burning of the liquid hydrocarbon fuel with a high cetane number in the compression ignition engine compared to the liquid hydrocarbon fuel with lower cetane number.

Methods have been developed to increase the cetane number of liquid hydrocarbon fuels. These conventional methods for reforming liquid hydrocarbon fuel involve using a batch reactor with a catalyst in solid phase, fuel in liquid phase, and oxygen in gas phase. However, such three-phase batch reactor systems are characterized by high temperatures, long reaction times, and constant monitoring, which makes these systems less practical for on-board fuel reforming. Further, these existing batch reactor systems further require separation of the particulate catalyst from the reactor effluent, which increases the weight and space needed for the batch reactor system.

The present disclosure solves these problems by providing systems for reforming hydrocarbon fuels, where the systems include a continuous flow reactor and fixed catalyst for reforming hydrocarbon fuel. In particular, the systems of the present disclosure comprise a microchannel reactor comprising a microchannel having the reforming catalyst coated onto the walls of the microchannel. The microchannel reactor may enable continuous reforming of hydrocarbon fuels, such as but not limited to gasoline, to produce reformed hydrocarbon fuel with greater cetane value without the need for separation of the solid particular catalyst from the reaction effluent, among other features.

Referring now to FIG. 1, the systems 100 of the present disclosure comprise at least one microchannel reactor 110 and at least one static mixer 130 upstream of the microchannel reactor 110. In embodiments, the system 100 may further include a gas-liquid separator 140 disposed downstream of the microchannel reactor 110. The microchannel reactor 110 can include a housing 112 and one or a plurality of microchannels 120 passing through the housing 112. The microchannel reactor 110 may comprise the housing 112 having a sufficient size to allow for the placement of the microchannel 120 inside of the housing 112.

As previously discussed, the microchannel reactor 110 may have one or a plurality of microchannels 120. Each microchannel 120 of the microchannel reactor 110 can include a microchannel inlet 121 and a microchannel outlet 122. The microchannel 120 can include at least one wall 123 which defines an interior cavity 124 of the microchannel 120. The microchannel 120 can also include a catalyst 125 (FIG. 2) coated onto the surfaces of the wall 123. Referring to FIG. 1, the microchannel inlet 121 can be fluidly coupled to the microstatic mixer 130 to pass a combined stream 134 comprising a hydrocarbon fuel 102 and an oxygen-containing gas 104 from the microstatic mixer 130 to the microchannel inlet 121. The microchannel 120 may have any suitable cross-sectional shape, such as circular, triangular, oval, square, polygonal, semicircular, irregular-shaped, or other suitable shape. The cross-sectional shape of the microchannel 120 is the shape that the wall 123 of the microchannel 120 makes in a plane that is perpendicular to a center axis of the microchannel 120. In embodiments, the at least one wall 123 of the microchannel 123 may have a circular cross-section.

The internal cavity 124 of the microchannel 120 may be defined by the wall 123. The inner cavity 124 of the microchannel 120 may extend through the housing 112 from the microchannel inlet 121 to the microchannel outlet 122. As shown in FIG. 1, in embodiments, the microchannel 120 may be arranged in a winding pathway from the microchannel inlet 121 to the microchannel outlet 122. It is to be understood that the microchannel 120 can be arranged in a variety of shapes not limited to the winding pathway depicted in FIG. 1. The internal cavity 124 can be different shapes, including but not limited to circular, semi-circular, and rectangular. In embodiments, the wall 123 of the microchannel 120 may have a largest cross-section dimension (such as an inner diameter for a circular cross-section or corner to corner distance for a square cross-section) of less than or equal to 5 millimeters (mm), less than or equal to 4 mm, less than or equal to 3 mm, or even less than or equal to 2 mm. The largest cross-sectional dimension refers to the largest distance between two points on the inner surface of the cross-section of the microchannel 120. In embodiments, the wall 123 of the microchannel 120 may have a largest cross-sectional dimension of from 0.1 mm to 5 mm, such as from 0.1 mm to 4 mm, from 0.1 mm to 3 mm, from 0.1 mm to 2 mm, from 0.1 mm to 1 mm, from 0.1 mm to 0.5 mm, from 0.5 mm to 5 mm, from 0.5 mm to 4 mm, from 0.5 mm to 3 mm, from 0.5 mm to 2 mm, or from 1 mm to 5 mm. In embodiments, the wall 123 of the microchannel 120 may be circular in cross-section and may have an inner diameter of from 0.1 mm to 5 mm, from 0.1 mm to 4 mm, from 0.1 mm to 3 mm, from 0.1 mm to 2 mm, from 0.1 mm to 1 mm, from 0.1 mm to 0.5 mm, from 0.5 mm to 5 mm, from 0.5 mm to 4 mm, from 0.5 mm to 3 mm, from 0.5 mm to 2 mm, or from 1 mm to 5 mm.

The microchannel 120 may have a length measured along the centerline of the microchannel 120 from the microchannel inlet 121 to the microchannel outlet 122. The length of the microchannel 120 may be sufficient to allow enough residence time of the hydrocarbon fuel 102 in contact with the oxygen-containing gas 104 in the presence of the catalyst to cause reaction of the hydrocarbon fuel to produce the reformed hydrocarbon fuel. Each microchannel 120 may have a length of from 0.05 meters (m) to 50 m, such as from 0.05 m to 10 m, from 0.2 m to 50 m, from 0.2 m to 10 m, from 0.5 m to 50 m, from 0.5 m to 10 m, from 1 m to 50 m, from 1 m to 10 m, or from 10 m to 50 m. The microchannel reactor 110 may have one or a plurality of microchannels 120. In embodiments, the microchannel reactor 110 may have a plurality of microchannel reactors 120. In embodiments, the two or more of the microchannels 120 may be connected in series (outlet to inlet) to increase the length of the reactor and to increase the residence time of the hydrocarbon fuel 102 and oxygen-containing gas 104 in the microchannel 120.

Figure 2:
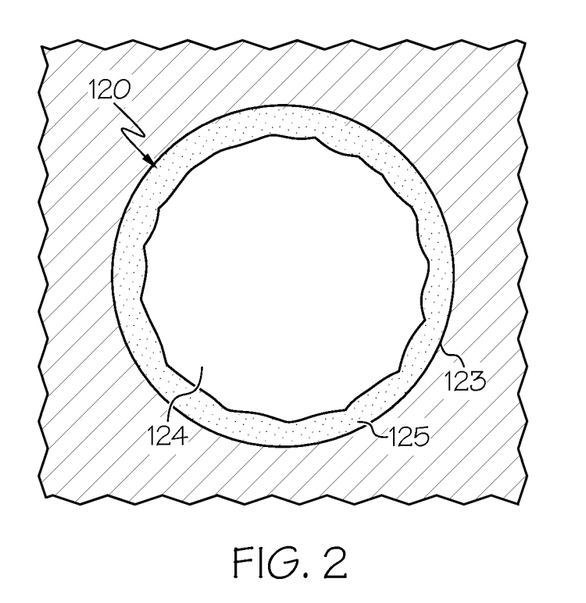
FIG. 2 schematically depicts a cross-sectional view of a microchannel of the microchannel reactor of FIG. 2, where the microchannel has a reforming catalyst deposited onto walls of the microchannel, according to embodiments shown and described in the present disclosure.

Referring now to FIG. 2, a cross-section of the microchannel 120 of the microchannel reactor 110 is schematically depicted. As previously discussed, the walls 123 of the microchannel 120 may be coated with the catalyst 125. The catalyst 125 may include an N-hydroxyimide group-containing compound, such as but not limited to N-hydroxyphthalimide (NHPI) or an NHPI derivative. The NHPI may be wash-coated onto or directly added to the walls 123 of the microchannel 120. The NHPI of the catalyst 125 may catalyze the reaction between the liquid hydrocarbon fuel 102 and the oxygen-containing gas 104 to produce a microchannel reactor effluent 128 comprising a reformed hydrocarbon fuel comprising higher cetane value components compared to the hydrocarbon fuel 102 introduced to the system 100. In embodiments, the catalyst 125 may comprise a composite catalyst that may be prepared by impregnating the NHPI onto a porous support. The composite catalyst may then be coated onto the surfaces of walls 123 of the microchannel 120. The porous support may be alumina, silica, zeolite, zirconia, metal carbide, amorphous silica-aluminate, active carbon, carbon-based materials, inert 2D materials like boron nitride (BN), and combinations of these support materials. In embodiments, the porous support may be a zeolite support having a silica to alumina molar ratio of 80 or 1500, or a silicalite having a silica to alumina ratio of 1500.

The NHPI may be loaded onto the porous support by preparing a slurry containing NHPI and the porous support in a solvent, such as acetonitrile ($CH_3CN$). The slurry may then be refluxed for 12 hours to disperse the NHPI throughout the support. The solvent may then be evaporated at 13 Kilopascal and 40 degrees Celsius. The powder may be further dried for 12 hours at 70 degrees Celsius (° C.). Alternatively, the porous support may be coated onto the walls 123 of the microchannels 120, and the NHPI may then be impregnated onto the porous support with the solvent by flowing the solvent-NHPI mixture through the microchannels 120.

Referring again to FIG. 1, the microchannel reactor 110 may further include a heat transfer system 150. The heat transfer system 150 may be operable to transfer heat to the microchannel 120 of the microchannel reactor 110 and the reaction mixture passing through the microchannel 120. The heat transfer system 150 may include one or more electrical heating units, a heat exchanger, or both configured to heat the microchannel 120 and the contents of the microchannel 120 to the reaction temperature of the reforming reaction.

Figure 3:
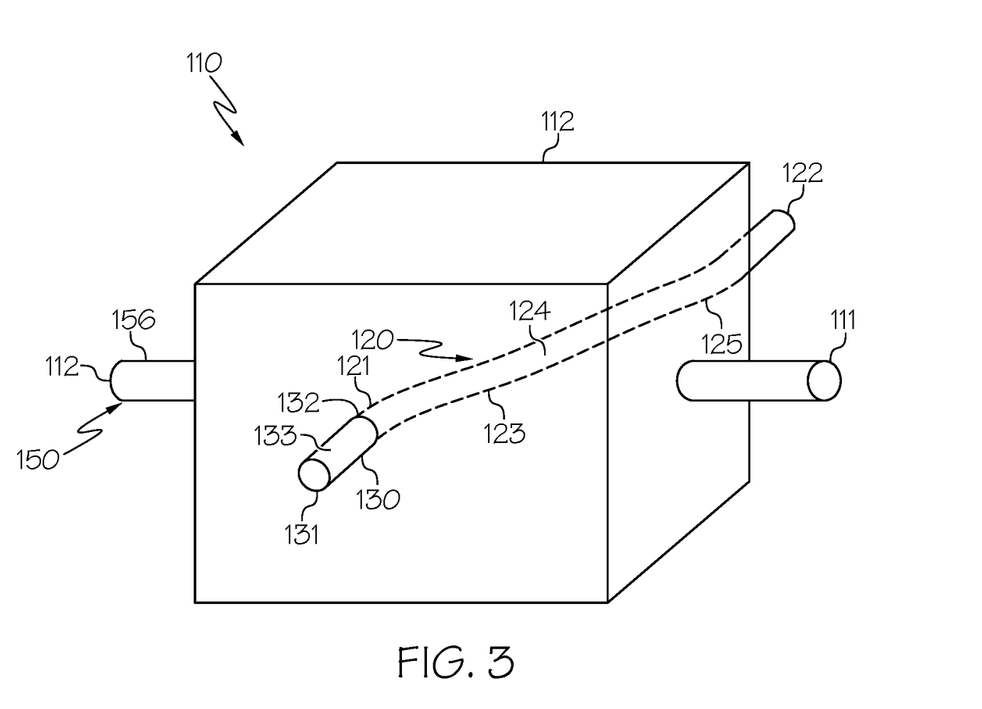
FIG. 3 schematically depicts a front perspective view of a microchannel reactor of the system of FIG. 1 for reforming a liquid hydrocarbon fuel, according to embodiments shown and described in the present disclosure.

Referring to FIGS. 1 and 3, in embodiments, the heat transfer system 150 may comprise a heat exchanger 152 operable to utilize waste heat from the combustion engine to heat the reactants in the microchannel reactor 120. In embodiments, the heat exchanger 152 may be operable to exchange heat between a heat transfer fluid 154 and the combined stream 134 passing through the microchannel 120 of the microchannel reactor 110. The heat exchanger 152 may comprises one or a plurality of heat transfer conduits 156 passing through the housing 112 of the microchannel reactor 110. Each of the heat transfer conduits 156 may have an inlet 157 and an outlet 158. The heat transfer conduits 156 may allow for the flow of the heat transfer fluid 154 through the housing 112 of the microchannel reactor 110 so that heat can be transferred from the heat transfer fluid 154 to the reaction mixture passed through the microchannel 120. In embodiments, the heat transfer conduits 156 may be positioned in a crossflow arrangement relative to the direction of flow of reactants through the microchannel 120. In embodiments, the heat transfer conduits 156 may be positioned in a counter flow arrangement relative to the direction of flow of reactants through the microchannel 120. In embodiments, the heat transfer conduits 156 may be positioned in a concurrent flow arrangement relative to the direction of flow of reactants through the microchannel 120. The heat transfer fluid 154 may be an engine exhaust stream, heated engine coolant, a microchannel reactor heat transfer fluid, or combinations of these. A microchannel reactor heat transfer fluid may refer to a heat transfer fluid used exclusively for the microchannel reactor 110 rather than a fluid produced by or used in conjunction with the compression ignition engine. In embodiments, the heat transfer fluid 154 may be heated upstream of the microchannel reactor 110 by waste heat produced from combustion of the hydrocarbon fuel 102, the reformed hydrocarbon fuel 144, or both in an engine of a vehicle. Although shown in FIG. 1 as a heat exchanger, in embodiments, the heat transfer system 150 can include one or more electrical heating elements (not shown), such as but not limited to heat tracing, resistive heating units, or other electrical heating units.

Referring again to FIG. 1, the system 100 further includes at least one microstatic mixer 130 disposed upstream of the microchannel reactor 110. Each microstatic mixer 130 may have a microstatic mixer inlet 131, a microstatic mixer outlet 132, and a mixing zone 133 disposed between the microstatic mixer inlet 131 and the microstatic mixer outlet 132. The microstatic mixer inlet 131 may be fluidly coupled to a hydrocarbon fuel source 103 to pass the hydrocarbon fuel 102 from the hydrocarbon fuel source 103 to the microstatic mixer 130. The microstatic mixer inlet 131 may be fluidly coupled to an oxygen-containing gas source 105 to pass the oxygen-containing gas 104 from the oxygen-containing gas source 105 to the microstatic mixer 130. The mixing zone 133 may include one or a plurality of mixing elements in the mixing zone 133, where the mixing elements are configured to create turbulent flow of materials passing through the mixing zone 133. The microstatic mixer 130 may be operable to mix the hydrocarbon fuel 102 and the oxygen-containing gas in the mixing zone 133 to produce the combined stream 134. The microstatic mixer outlet 132 may be fluidly coupled to the microchannel inlet 121 to pass the combined stream 134 from the microstatic mixer 130 to the microchannel 120 of the microchannel reactor 110. In embodiment, the system 100 may include a plurality of microstatic mixers 130, which may be arranged in series or in parallel. When the microchannel reactor 110 comprises a plurality of microchannels 120, the system 100 may include a plurality of microstatic mixers 130, each of which may be fluidly coupled to a microchannel inlet 121 of one of the microchannels 120.

Referring again to FIG. 1, the microstatic mixer inlet 131 may be fluidly coupled to the hydrocarbon fuel source 103, which may enable the hydrocarbon fuel 102 to be passed from the hydrocarbon fuel source 102 to the microstatic mixer 130. The hydrocarbon fuel 102 may be a liquid hydrocarbon fuel. The hydrocarbon fuel 102 may be passed to the microstatic mixer 130 through use of a fuel pump (not shown) or through hydrostatic pressure resulting from gravity by positioning the hydrocarbon fuel source 103 vertically above the microstatic mixer 130. The hydrocarbon fuel source 103 may be any vessel suitable for the storage of the hydrocarbon fuel 102. The hydrocarbon fuel 102 may be a liquid hydrocarbon fuel, such as but not limited to gasoline, diesel fuel, or any other suitable liquid hydrocarbon fuel capable of being oxidized to increase the cetane value. The hydrocarbon fuel 102 may have a Derived Cetane Number (DCN) of less than 21, or even less than or equal to 20. In embodiments, the system 100 may further include a fuel control valve 106, which may be configured to control the flow rate of the hydrocarbon fuel 102 to the microstatic mixer 130.

As previously discussed, the microstatic mixer inlet 131 may be fluidly coupled to the oxygen-containing gas source 105, which may enable the oxygen-containing gas 104 to be passed from the oxygen-containing gas source 105 to the microstatic mixer 130. The oxygen-containing gas source 105 may be a vessel containing pressurized oxygen-containing gas, air from the atmosphere, oxygen-containing gas recovered as a gas stream 146 separated from the reactor effluent, other oxygen-containing gas source, or combinations thereof. In embodiments, the oxygen-containing gas source 105 may include a compressor configured to increase the pressure of the oxygen-containing gas 104 upstream of the microstatic mixer 130. The oxygen-containing gas 104 may be air, oxygen, pressurized oxygen-containing gas, gas stream recovered from the microchannel reactor effluent, or any other suitable oxygen-containing gas, or combinations of oxygen-containing gases. The oxygen-containing gas 104 may have an oxygen content from 15 percent oxygen by volume to 100 percent oxygen by volume. In embodiments, the system 100 may further comprise an oxygen-containing gas control valve 107 configured to control the flow rate of the oxygen-containing gas 104 to the microstatic mixer 130.

Referring again to FIG. 1, during operation of the system 100, the hydrocarbon fuel 102 and the oxygen-containing gas 104 may be passed to the microstatic mixer 130. The flow rate of the hydrocarbon fuel 102 may be adjusted by manipulating the hydrocarbon fuel control valve 106, and the flow rate of the oxygen-containing gas 104 can be adjusted by manipulating the oxygen-containing gas control valve 107. The volumetric ratio of the oxygen-containing gas 104 to the hydrocarbon fuel 102 passed to the microstatic mixer 130 can be from 1 to 1000.

The hydrocarbon fuel 102 and the oxygen-containing gas 104 can be passed through the microstatic mixer 130, which may mix the hydrocarbon fuel 102 and the oxygen-containing gas 104 to produce the combined stream 134. The combined stream 134 may comprise a dispersion of the oxygen-containing gas 104 in the form of microbubbles dispersed in the liquid phase of the hydrocarbon fuel. In embodiments, mixing the hydrocarbon fuel 102 and the oxygen-containing gas 104 in the microstatic mixer 130 may cause at least a portion of the oxygen-containing gas 104 to dissolve into the liquid phase of the hydrocarbon fuel 102. The combined stream 134 may then be passed from the microstatic mixer 130 to the microchannel 120 of the microchannel reactor 110. Within the microchannel 120, the hydrocarbon fuel contacts oxygen from the oxygen-containing gas in the presence of the catalyst 125 (NHPI) at a reaction temperature sufficient to cause at least a portion of the hydrocarbons from the hydrocarbon fuel 102 to undergo one or more reforming reactions, such as but not limited to oxidation reactions, to produce a microchannel reactor effluent 128 comprising a reformed hydrocarbon fuel having a cetane value greater than a cetane value of the hydrocarbon fuel 102. In embodiments, contacting the hydrocarbon fuel with oxygen in the presence of the catalyst 125 may cause at least a portion of the hydrocarbons from the hydrocarbon fuel 102 to undergo oxidation reactions to produce the microchannel reactor effluent 128. During operation, the heat transfer system 150 may be operated to heat the combined stream 134 as it passes through the microchannel reactor 110. The combined stream 134 in the microchannel 120 may be maintained at the reaction temperature by the heat transfer system 150.

The microchannel reactor effluent 128 may comprise reformed hydrocarbon fuel, unreacted oxygen-containing gas, and any other gases produced in the microchannel reactor 110. Referring again to FIG. 1, the system 100 may further include a gas-liquid separator 140 disposed downstream of the microchannel reactor 110. The gas-liquid separator 140 may include a separator inlet 141, a gas outlet 142, and liquid outlet 143. The microchannel outlet 122 may be fluidly coupled to the separator inlet 141 so that the microchannel reactor effluent 128 may be passed from the microchannel reactor 110 to the gas-liquid separator 140. During operation, the microchannel reactor effluent 128 may be passed directly from the microchannel outlet 122 to the separator inlet 141 of the gas-liquid separator 140. The gas-liquid separator 140 may be configured and operable to separate the excess oxygen-containing gas and any other gases from the hydrocarbon liquids to produce a reformed hydrocarbon fuel 144 and a gas stream 146. The reformed hydrocarbon fuel 144 may be passed out of the gas-liquid separator 140 from the liquid outlet 143. The gas stream 146 may be passed out of the gas-liquid separator 140 from the gas outlet 142.

The gas stream 146 may comprise the unreacted oxygen-containing gas from the microchannel reactor effluent 128. The gas stream 146 may also include some volatile hydrocarbons from the reformed hydrocarbon fuel or any light gases produced in the microchannel reactor 110. In embodiments, the gas outlet 142 may be vented to the atmosphere to enable the gas stream 146 to be vented from the system 100. In embodiments, the gas outlet 142 may be fluidly coupled to an exhaust gas treatment system (not shown) of a vehicle to treat the gas stream 146 to remove any volatile organic compounds or other contaminants prior to venting the gas stream 146 from the system 100. In embodiments, the gas outlet 142 may be fluidly coupled to the microstatic mixer inlet 131 so that the gas stream 146 can be recycled back to the microstatic mixer 130 as at least a portion of the oxygen-containing gas 104.

Referring again to FIG. 1, the reformed hydrocarbon fuel 144 may be passed out of the gas-liquid separator 140 through the liquid outlet 146. The reformed hydrocarbon fuel 144 may include at least 90%, at least 95%, at least 98%, or even at least 99% by weight of the hydrocarbon compounds from the microchannel reactor effluent 128. The reformed hydrocarbon fuel 144 may have a Derived Cetane Number (DCN) that is greater than the DCN of the hydrocarbon fuel 102 before reforming by at least 10%, at least 15%, at least 20%, or at least 25%. The reformed hydrocarbon fuel 144 may have a DCN that is from 15% to 60% greater than the DCN of the hydrocarbon fuel 102 before reforming. In embodiments, the reformed hydrocarbon fuel 144 may have a DCN of greater than or equal to 21, greater than or equal to 23, or even greater than or equal to 25. In embodiments, the reformed hydrocarbon fuel 144 may have a DCN of from 21 to 35, from 21 to 30, from 21 to 28, from 23 to 35, from 23 to 30, from 23 to 28, from 25 to 35, from 25 to 30, from 25 to 28, of from 28 to 35. In embodiments, the reformed hydrocarbon fuel 144 may include hydroperoxides. In embodiments, the reformed hydrocarbon fuel 144 may have a concentration of hdyroperoxide compounds of greater than or equal to 0.001 moles per liter (mol/L), greater than or equal to 0.002 mol/L, or even greater than or equal to 0.005 mol/L. The reformed hydrocarbon fuel 144 may have a concentration of hydroperoxide compounds of from 0.001 mol/L to 0.010 mol/L, from 0.002 mol/L to 0.010 mol/L, or even from 0.005 to 0.010 mol/L.

In embodiments, the liquid outlet 143 may be fluidly coupled to a reformed hydrocarbon fuel tank 148 to pass the reformed hydrocarbon fuel 144 from the gas-liquid separator 140 to the reformed hydrocarbon fuel tank 148. The reformed hydrocarbon fuel tank 148 may store the reformed hydrocarbon fuel 144 for use in a vehicle engine.

Figure 4:
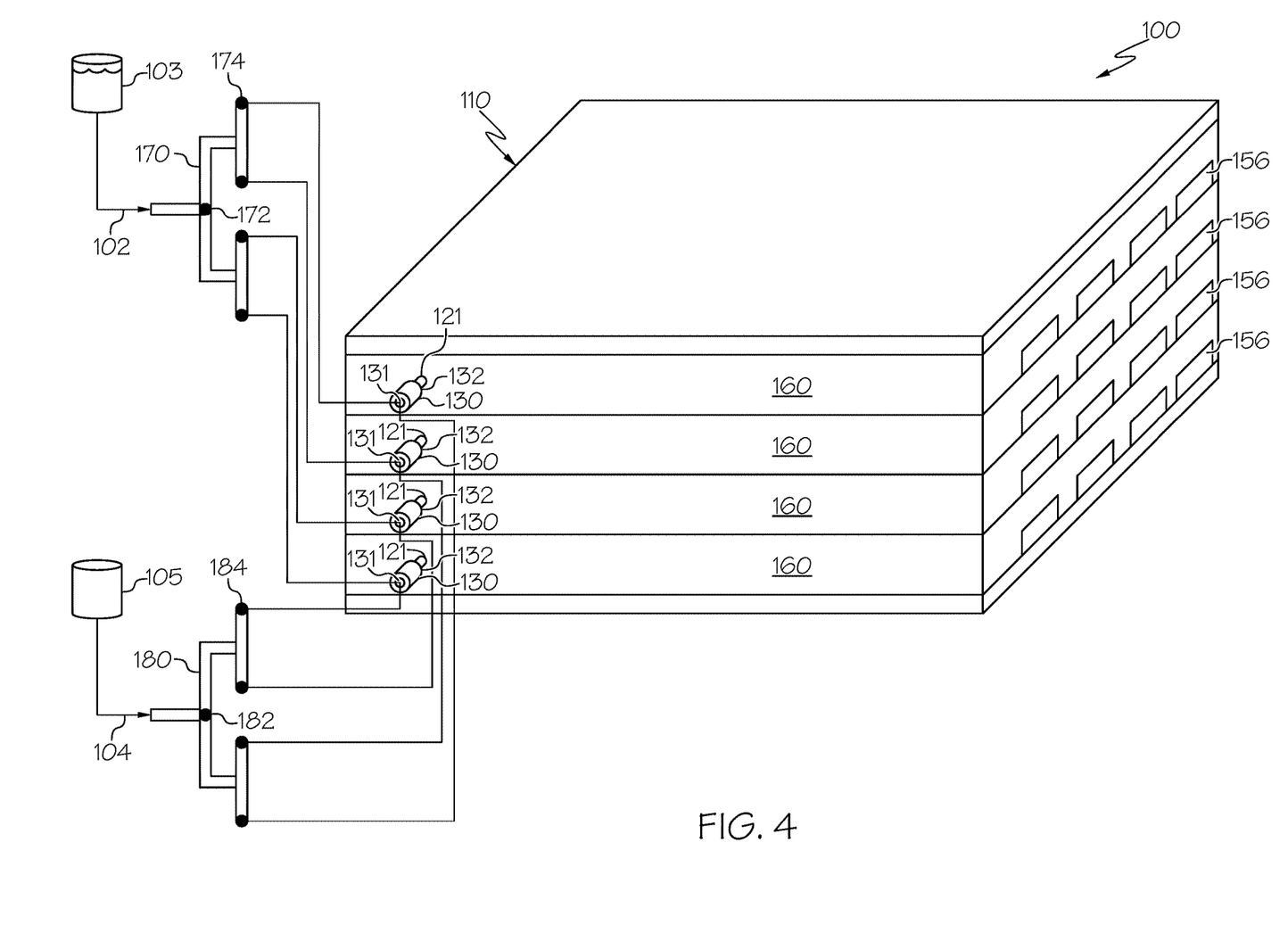
FIG. 4 schematically depicts a front perspective view of an embodiment of a system having a microchannel reactor comprising a plurality of reactor plates stacked one on top of the other, according to embodiments shown and described in the present disclosure.

As previously discussed, in embodiments, the microchannel reactor 110 can include a plurality of microchannels 120. Referring now to FIG. 4, in embodiments, the microchannel reactor 110 may include a plurality of reactor plates 160 arranged in parallel, such as being stacked one on top of the other. When the microchannel reactor 110 comprises a plurality of reactor plates 160, the microchannel reactor 110 may have 2, 3, 4, 5, 6, 7, 8, or more than 8 microchannels 120. In embodiments, the microchannels 120 of the plurality of reactor plates 160 may be operated in parallel. In embodiments, two or more of the microchannels 120 maybe fluidly coupled end-to-end in series. Fluidly coupling two or more microchannels 120 from two or more reactor plates 160 may enable the length of the microchannel to be increased to increase the reaction time of the hydrocarbon fuel and the oxygen-containing gas in the presence of the catalyst 125.

Figure 5:
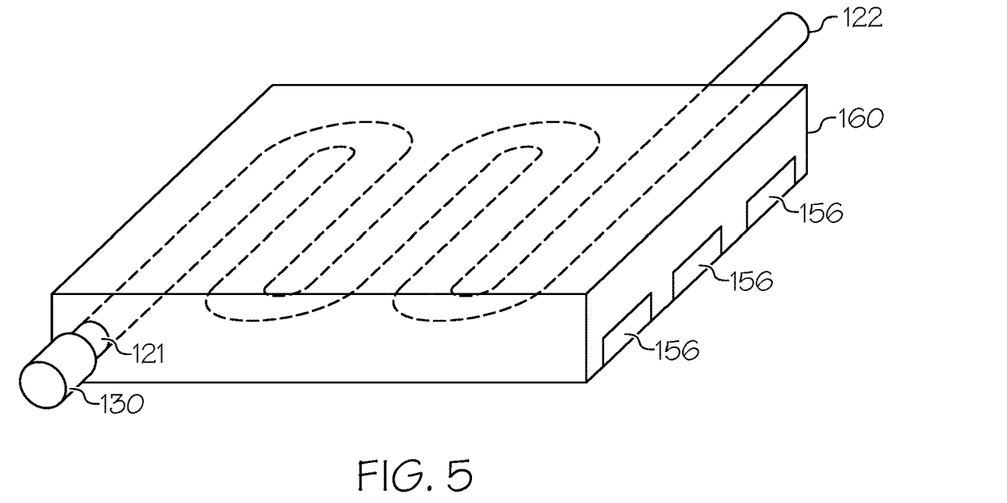
FIG. 5 schematically depicts a front perspective view of a single reactor plate of the microchannel reactor of FIG. 4, according to embodiments shown and described in the present disclosure.

Referring now to FIG. 5, in embodiments, each of the reactor plates 160 may comprise one microchannel 120 and one microstatic mixer 130 fluidly coupled to the microchannel inlet 121 of the microchannel 120. Each of the reactor plates 160 may also include one or a plurality of heat transfer fluid conduits 156 in one of more sides for passing a heat transfer fluid 154 into contact with a surface of the reactor plate 160. In embodiments, each reactor plate 160 may be solid with the microchannel 120 extending in a circuitous route through the reactor plate 160.

Figure 6:
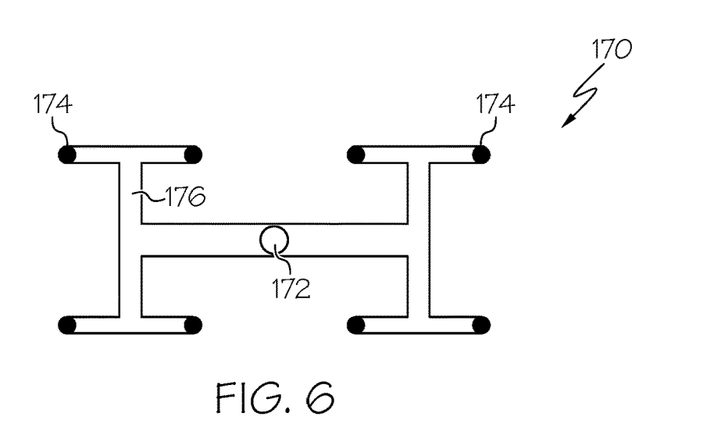
FIG. 6 schematically depicts a front view of a fuel distributor of the system of FIG. 4, according to embodiments shown and described in the present disclosure.

Referring again to FIG. 4, when the microchannel reactor 110 comprises a plurality of microchannels 120, such as when the microchannel reactor 110 comprises a plurality of reactor plates 160, the system 100 may further include a fuel distributor 170 and an oxygen-containing gas distributor 180. Referring now to FIGS. 4 and 6, the fuel distributor 170 may have a fuel distributor inlet 172 and a plurality of fuel distributor outlets 174. The fuel distributor inlet 172 may be fluidly coupled to the hydrocarbon fuel source 103 to pass the hydrocarbon fuel to the fuel distributor 170. In embodiments, the fuel distributor 170 may have a plurality of branches 176 that operate to divide the single flow of the hydrocarbon fuel 102 from the hydrocarbon fuel source 103 into a plurality of equal parts, or individual flows, for distribution to the plurality of microchannels 120. As shown in FIG. 6, in embodiments, the fuel distributor 170 can be a fractal distributor in which each of the plurality of branches are precisely engineered to divide the single flow of the hydrocarbon fuel evenly to each of the fuel distributor outlets 174. In embodiments, the fuel distributor 170 may include one or a plurality of flow restrictions, such as but not limited to orifice plates, which may be sized to separate the flow of the hydrocarbon fuel 102 evenly to each of the fuel distributor outlets 174.

The fuel distributor 170 may include a number of fuel distributor outlets 174 equal to the number of the plurality of microchannels 120 of the microchannel reactor 110. Each of the plurality of fuel distributor outlets 174 may be fluidly coupled to an inlet of one of the microstatic mixers 130 associated with one of the microchannels 120. The fuel distributor 170 may be operable to distribute the hydrocarbon fuel 102 evenly to each of the plurality of microstatic mixers 130.

Figure 7:
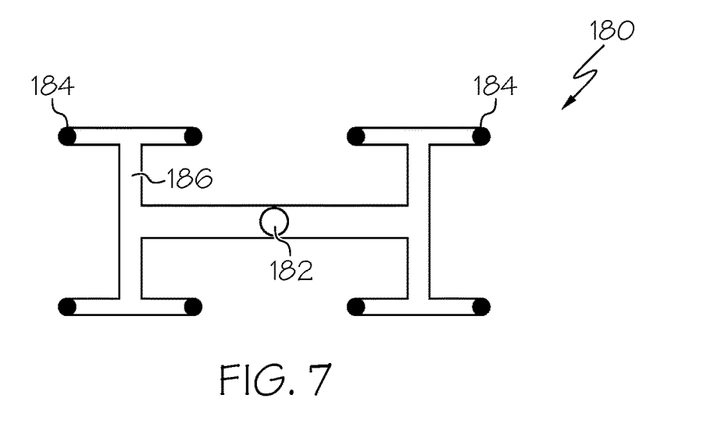
FIG. 7 schematically depicts a front view of an oxygen-containing gas distributor, according to embodiments shown and described in the present disclosure.

Referring now to FIGS. 4 and 7, the oxygen-containing gas distributor 180 may have a gas distributor inlet 182 and a plurality of gas distributor outlets 184. The gas distributor inlet 182 may be fluidly coupled to the oxygen-containing gas source 105 to pass the oxygen-containing gas 104 to the oxygen-containing gas distributor 180. In embodiments, the oxygen-containing gas distributor 180 may have a plurality of branches 186 that operate to divide the single flow of the oxygen-containing gas 104 from the oxygen-containing gas source 105 into a plurality of equal parts, or individual flows, for distribution to the plurality of microchannels 120. As shown in FIG. 7, in embodiments, the oxygen-containing gas distributor 180 can be a fractal distributor in which each of the plurality of branches are precisely engineered to divide the single flow of the oxygen-containing gas 104 evenly to each of the gas distributor outlets 184. In embodiments, the oxygen-containing gas distributor 180 may include one or a plurality of flow restrictors, such as but not limited to orifice plates, which may be sized to separate the flow of the oxygen-containing gas 104 evenly to each of the gas distributor outlets 184.

The oxygen-containing gas distributor 180 may include a number of gas distributor outlets 184 equal to the number of the plurality of microchannels 120 of the microchannel reactor 110. Each of the plurality of gas distributor outlets 184 may be fluidly coupled to an inlet of one of the microstatic mixers 130 associated with one of the microchannels 120. The oxygen-containing gas distributor 180 may be operable to distribute the oxygen-containing gas 104 evenly to each of the plurality of microstatic mixers 130.

The fuel distributor 170 and the oxygen-containing gas distributor 180 may be used to distribute the hydrocarbon fuel 102 and the oxygen-containing gas 104, respectively, to each of the plurality of microchannels 120 arranged in parallel. A single flow of the oxygen-containing gas 104 may be passed to the gas inlet 182 of the oxygen-containing gas distributor 180, which divides the oxygen-containing gas 104 evenly into a plurality of individual flows of the oxygen-containing gas. The individual and equal flows of the oxygen-containing gas are then each passed to one of the microstatic mixers 130. A single flow of the hydrocarbon fuel 102 may be passed to the fuel distributor inlet 172 of the fuel distributor 170, which then divides the hydrocarbon fuel 102 evenly into a plurality of individual flows of the hydrocarbon fuel. The individual and equal flows of the hydrocarbon fuel are then each passed to one of the microstatic mixers 130. Each of the plurality of microstatic mixers are fluidly coupled to the plurality of microchannels 120.

Figure 8:
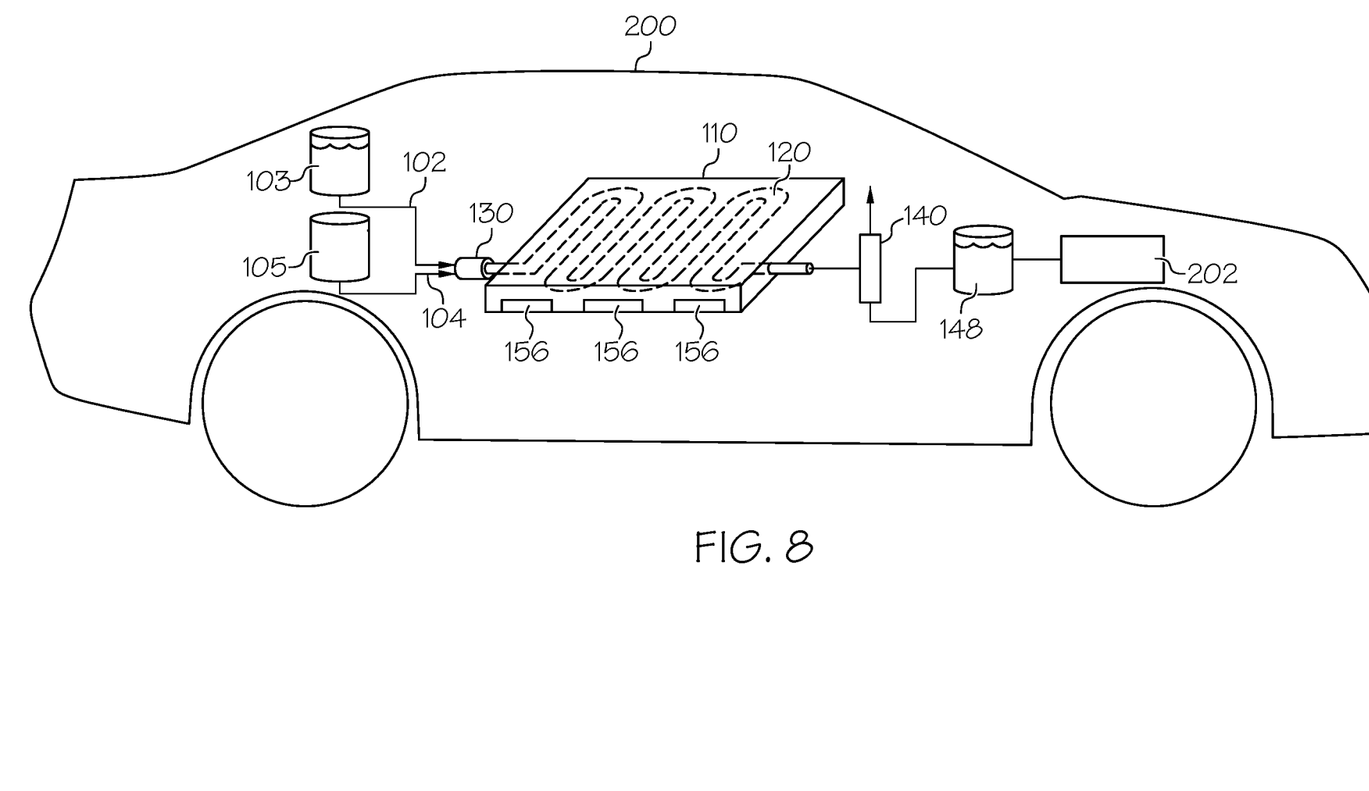
FIG. 8 schematically depicts a vehicle comprising a system for reforming a hydrocarbon fuel, according to embodiments shown and described in the present disclosure.

The system 100 may be useful for onboard fuel reforming for vehicles, such as but not limited to vehicle comprising compression ignition engines. Referring now to FIG. 8, in embodiments, the system 100 for reforming liquid hydrocarbon fuel may be onboard a vehicle 200. The vehicle 200 may be any means of transport that comprises a gasoline compression engine 202. The gasoline compression engine 202 of the vehicle 200 may be fluidly coupled to the reformed hydrocarbon fuel tank 148. In embodiments, the gasoline compression engine 202 may utilize the reformed hydrocarbon fuel 144 from the reformed hydrocarbon fuel tank 148, resulting in quicker ignition of the reformed liquid hydrocarbon fuel, improved efficiency, and fewer emissions.

Figure 9:
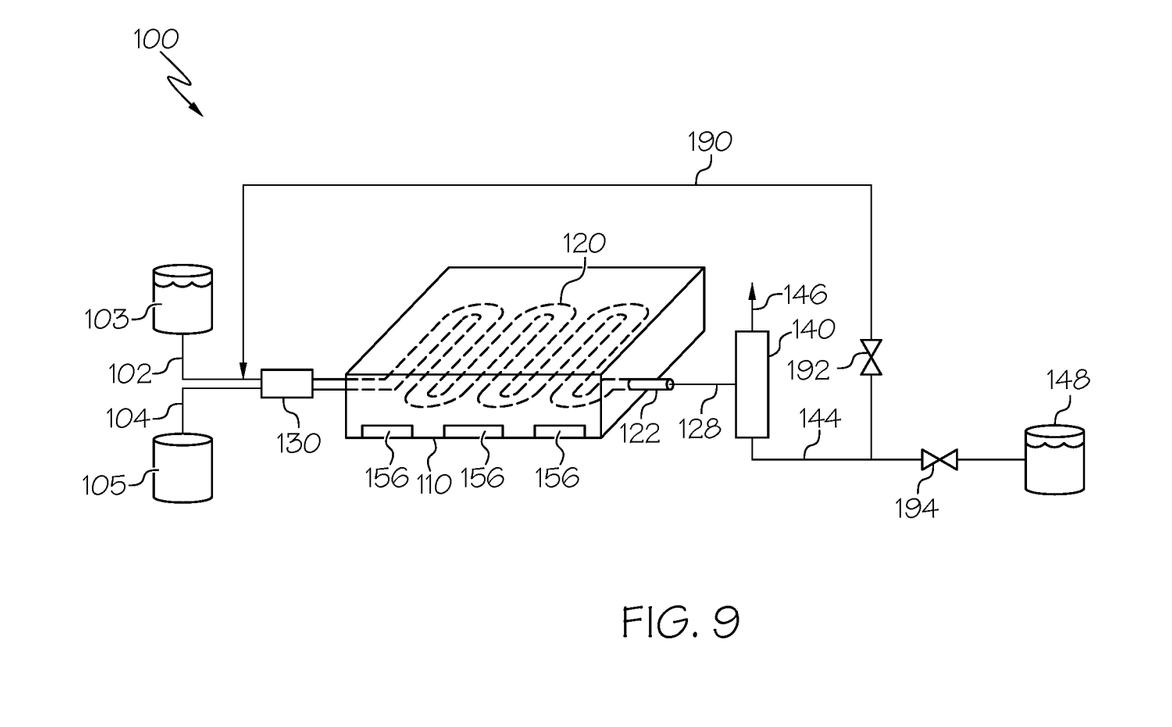
FIG. 9 schematically depicts a control system for controlling recycle of a reformed hydrocarbon fuel, according to embodiments shown and described in the present disclosure.

Referring now to FIG. 9, in embodiments, the system 100 may comprise a reformed fuel recycle line 190 operable to pass the reformed hydrocarbon fuel 144 back to the inlet of the microstatic mixer 130. The reformed fuel recycle line 190 may be utilized to further increase the DCN of the reformed hydrocarbon fuel 144 by recycling the reformed hydrocarbon fuel 144 back to the microchannel reactor 110 and contacting the reformed hydrocarbon fuel 144 (with or without additional hydrocarbon fuel 102) with the oxygen-containing gas 104 in the presence of the catalyst 125 in the microchannel 120 to further oxidize the reformed hydrocarbon fuel 144. The system 100 may further include a fuel recycle valve 192, a reformed fuel valve 194, or both. The fuel recycle valve 192 may be disposed in the reformed fuel recycle line 190 and may be operable to control the flow of the reformed hydrocarbon fuel 144 through the reformed fuel recycle line 190 back to the microstatic mixer 130. The reformed fuel valve 194 may be disposed in the line leading to the reformed hydrocarbon fuel tank 148. The reformed fuel valve 194 may control the flow of the reformed hydrocarbon fuel 144 to the reformed hydrocarbon fuel tank 148. The fuel recycle valve 192, the reformed fuel valve 194, or both may be manipulated to control the flow of the reformed hydrocarbon fuel 144 through reformed fuel recycle line 190 or to the reformed hydrocarbon fuel tank 148. In embodiments, the reformed hydrocarbon fuel 144 may be continuously recycled back to the microstatic mixer 130 and microchannel reactor 110 for a reaction time sufficient to increase the DCN of the reformed hydrocarbon fuel 144 to a target DCN, such as a DCN of greater than or equal to 21, greater than or equal to 25, greater than or equal to 28, or even greater than or equal to 30.

Referring again to FIG. 1, a process for reforming the hydrocarbon fuel 102 is further disclosed. The process may comprise passing the hydrocarbon fuel 102 and the oxygen-containing gas 104 to the microstatic mixer 130 that mixes the hydrocarbon fuel 102 and the oxygen-containing gas 104 to produce the combined stream 134. The microstatic mixer 130 may have any of the features previously discussed in the present disclosure for the microstatic mixer 130. The process may further include passing the combined stream 134 to the microchannel reactor 110, which may comprise the microchannel 120 defined by at least one wall 123. The at least one wall 123 may include a catalyst 125 (FIG. 2) coated on a surface of the at least one wall 123. The catalyst 125 may comprise NHPI. The microchannel reactor 110 may have any of the features, properties, or operating conditions discussed in the present disclosure for the microchannel reactor 110. The process may further include heating the microchannel reactor 110 to the reaction temperature, and contacting the hydrocarbon fuel 102 with the oxygen-containing gas 104 in the presence of the catalyst 125 in the microchannel 120 at the reaction temperature, where the contacting may cause at least a portion of hydrocarbons in the hydrocarbon fuel to react to produce a microchannel reactor effluent 128 comprising a reformed hydrocarbon fuel having a DCN greater than a DCN of the hydrocarbon fuel upstream of the microchannel reactor 110.

Referring again to FIG. 1, in embodiments, the process may further include separating the microchannel reactor effluent 128 to produce the reformed hydrocarbon fuel 144 and a gas stream 146 comprising excess oxygen-containing gas. Separating microchannel reactor effluent 128 may include passing the microchannel reactor effluent 128 to the gas-liquid separator 140 disposed downstream of the microchannel reactor 110, where the gas-liquid separator 140 separates the microchannel reactor effluent 128 into the reformed hydrocarbon fuel 144 and the gas stream 146.

In embodiments, the process may comprise contacting the hydrocarbon fuel with the oxygen-containing gas in the presence of the catalyst at the reaction temperature of from 25° C. to 150° C., such as from 25° C. to 140° C., from 25° C. to 130° C., from 25° C. to 120° C., from 25° C. to 100° C., from 50° C. to 150° C., from 50° C. to 140° C., from 50° C. to 130° C., from 50° C. to 120° C., from 50° C. to 100° C., from 75° C. to 150° C., from 75° C. to 140° C., from 75° C. to 130° C., from 75° C. to 120° C., from 75° C. to 100° C., from 100° C. to 150° C., from 100° C. to 140° C., from 100° C. to 130° C., from 100° C. to 120° C., or from 120° C. to 150° C. In embodiments, the process may include contacting the hydrocarbon fuel with the oxygen-containing gas in the presence of the catalyst at a reaction pressure of from ambient pressure to 1000 kilopascals (kPa), such as from 100 kPa to 1,000 kPa, from 100 kPa to 800 kPa, from 100 kPa to 500 kPa, from 200 kPa to 1000 kPa, from 200 kPa to 800 kPa, from 200 kPa to 500 kPa, from 500 kPa to 1000 kPa, or from 500 kPa to 800 kPa.

In embodiments, the process may include contacting the hydrocarbon fuel with the oxygen-containing gas in the presence of the catalyst for a reaction time in the microchannel 120 of from 1 second to 24 hours, such as from 1 second to 10 hours, from 1 second to 5 hours, from 1 second to 1 hour, from 1 second to 1 minutes, from 30 seconds to 24 hours, from 30 seconds to 10 hours, from 30 seconds to 5 hours, from 30 seconds to 1 hour, from 30 second to 30 minutes, from 1 minute to 24 hours, from 1 minute to 10 hours, from 1 minute to 5 hours, from 1 minute to 1 hour, from 1 minute to 30 minutes, from 30 minutes to 24 hours, from 30 minutes to 10 hours, from 30 minutes to 5 hours from 30 minutes to 1 hour, from 1 hour to 24 hours, from 1 hour to 10 hours, from 1 hour to 5 hours, or from 5 hours to 24 hours. In embodiments, the process may include passing the hydrocarbon fuel 102 to the microstatic mixer 130 at a liquid hourly space velocity (LHSV) of from 1 per hour to 100 per hour. In embodiments, the process may include passing the hydrocarbon fuel 102 to each of the microstatic mixers 130 at a flow rate of from 10 liters per hour to 15 liters per hour. In embodiments, the process may include passing the oxygen-containing gas 104 to the microstatic mixer 130 at a gas hourly space velocity (GHSV) of from 100 per hour to 10,000 per hour.

In embodiments, the process may include passing the reformed hydrocarbon fuel 144 to the reformed hydrocarbon fuel tank 148, and storing the reformed hydrocarbon fuel 144 in the reformed hydrocarbon fuel tank 148 until needed by the engine of a vehicle. In embodiments, the reformed hydrocarbon fuel 144 may be passed to a compression ignition engine of a vehicle. In embodiments, the reformed hydrocarbon fuel 144 may be recycled back to the microstatic mixer 130 and the microchannel reactor 110. The reformed hydrocarbon fuel 144 may be combined with new hydrocarbon fuel 102 upstream of the microstatic mixer 130. In embodiments, the process may include circulating the reformed hydrocarbon fuel 144 through the microchannel reactor 110 for a period of time sufficient to increase the DCN of the reformed hydrocarbon fuel 144 to a threshold DCN of greater than or equal to 21, greater than or equal to 25, greater than or equal to 28, or even greater than or equal to 30. In embodiments, the gas stream 146 recovered from the gas-liquid separator 140 may be recycled back to the microstatic mixer 130 to provide at least a portion of the oxygen-containing gas 104 to the microstatic mixer 130. In embodiments, the process may include determining a DCN of the reformed hydrocarbon fuel and determining whether to recycle at least a portion of or all of the reformed hydrocarbon fuel back to the microstatic mixer 130 and microchannel reactor 110 based on the DCN of the reformed hydrocarbon fuel 144.

EXAMPLES

The various embodiments of systems and methods for reforming a liquid hydrocarbon fuel will be further clarified by the following examples. The examples are illustrative in nature, and should not be understood to limit the subject matter of the present disclosure.

Example 1: Varying Operation Temperature in NHPI Reaction

Figure 10:
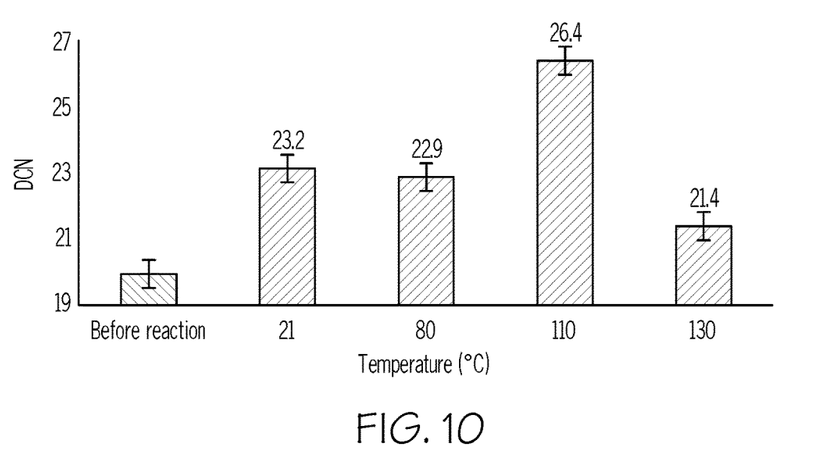
FIG. 10 graphically depicts cetane values (DCN) of reformed hydrocarbon fuel produced from reforming at different temperatures in a laboratory setting, according to embodiments shown and described in the present disclosure.

In Example 1, operation temperature for catalyzed oxidation of gasoline using NHPI catalyst was investigated. For Example 1, 100 milliliters of gasoline and pure air at a pressure of 300 Kilopascal were reacted in the presence of 1 weight percent NHPI at a temperature that ranged from room temperature to 130 degrees Celsius for 3 hours. FIG. 10 graphically depicts the derived cetane number (DCN) (y-axis) for each of the reaction temperatures (x-axis). At 130 degrees Celsius, a decrease in the DCN was observed;

this may be due to the auto catalytic oxidation of hydrocarbon at temperatures above 126 degrees Celsius.

Example 2: Comparing Activity of Unsupported NHPI to Supported NHPI

In Example 2, the performance of NHPI supported on a catalyst support was compared to the performance of unsupported NHPI for reforming gasoline. Example 2 was conducted in a batch reactor. 10 weight percent of NHPI was supported over different porous support materials: aluminum oxide, silicon dioxide nano powder, USY zeolite (Si/Al2 ratio of 80) and silicalite (Si/Al2 ratio of 1500). NHPI was deposited onto the support material by mixing NHPI and the porous support in a solvent, such as Acetonitrile ($CH_3CN$). The solvent was then evaporated and the powder dried for an additional 12 hours at 70 degrees Celsius.

Figure 11:
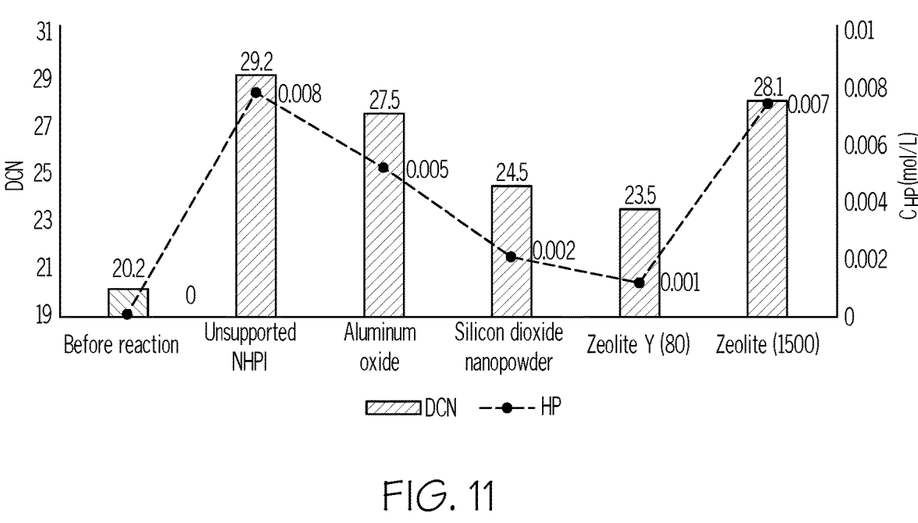
FIG. 11 graphically depicts cetane values of reformed hydrocarbon fuel produced from conducting reforming reactions using different catalyst support materials in a laboratory setting, according to embodiments shown and described in the present disclosure.

The activity of the supported NHPI and unsupported NHPI powder was determined under batch conditions at a temperature of 110 degrees Celsius and a pressure of 1,000 Kilopascal. As FIG. 11 illustrates, unsupported NHPI had better activity, higher DCN, and greater hydroperoxide concentration (Clip) compared to the supported NHPI. The DCN achieved through unsupported NHPI was 29.2, while the DCN achieved through NHPI supported on silicalite with Si/Al2 ratio of 1500 was 28.1.

Example 3: Altering Oxygen Reaction Pressure

Figure 12:
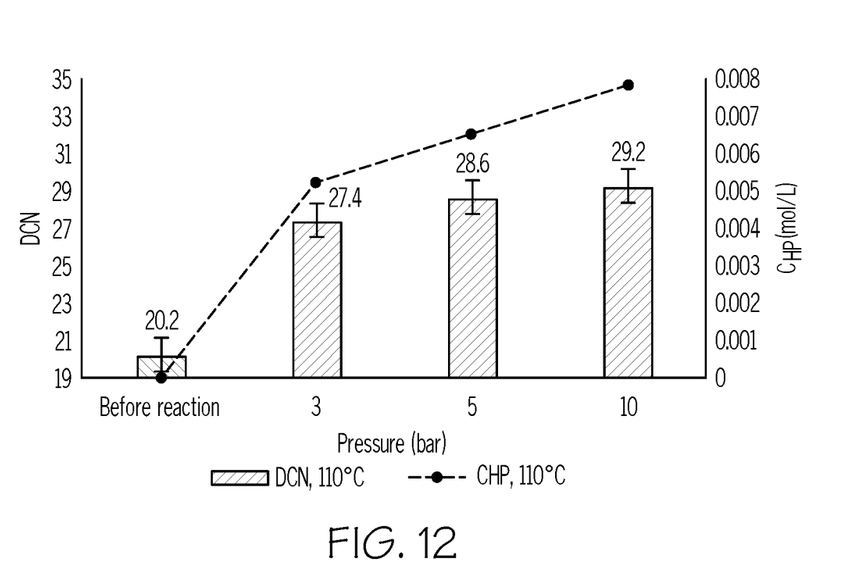
FIG. 12 graphically depicts cetane values of reformed hydrocarbon fuels produced by conducting reforming reactions at different pressures in a laboratory setting, according to embodiments shown and described in the present disclosure.

Example 3 was conducted in a batch reaction mode. 100 milliliters of gasoline and pure oxygen were reacted at a pressure varied from 300 Kilopascal to 1,000 Kilopascal at 110 degrees Celsius for 3 hours in the presence of 1 weight percent NHPI. Discussion of the experiments of Example 3 can be found in Al-Taher et al., "Aerobic Oxidation of Hydrocarbons Using N-Hydroxyphthalimide (NHPI) Catalysts for Cetane Enhancement," J. Fuel (15 Sep. 2022), vol. 324, Part B, (available at https://doi.org/10.1016/J.fuel.2022.124563), the entire contents of which are incorporated by reference into the present disclosure. FIG. 12 illustrates that the higher the Oxygen reaction pressure, the higher the DCN and CHP concentration.

A first aspect of the present disclosure is directed to a system for reforming a hydrocarbon fuel, the system comprising a microchannel reactor comprising a microchannel, where the microchannel may have a microchannel inlet, a microchannel outlet, at least one wall, and a catalyst deposited on the at least one wall of the microchannel. The at least one wall may define an interior cavity. The catalyst may comprise N-Hydroxyphthalimide (NHPI). The system may further include a heat transfer system configured to actively transfer heat across the at least one wall of the microchannel and a microstatic mixer upstream of the microchannel. The microstatic mixer may have a microstatic mixer inlet and microstatic mixer outlet, the microstatic mixer outlet may be in fluid communication with the microchannel inlet, and the microstatic mixer inlet may be fluidly coupled to a hydrocarbon fuel source and an oxygen containing gas source.

A second aspect of the present disclosure may include the first aspect, where the microchannel may have a length of from 0.05 m to 50 meters.

A third aspect of the present disclosure may include any one of the first through third aspects, where the microchannel may have a length of from 0.2 meter to 10 meters.

A fourth aspect of the present disclosure may include any one of the first through third aspects, where the microchannel may have a largest cross-sectional dimension of from 0.1 millimeters to 5 millimeters.

A fifth aspect of the present disclosure may include any one of the first through fourth aspects, where the NHPI may be deposited directly onto a surface of the at least one wall of the microchannel.

A sixth aspect of the present disclosure may include the fifth aspect, where the catalyst may be deposited on the surface of the at least one wall of the microchannel by a method comprising the steps of dissolving the catalyst in a solvent to produce a catalyst-solvent mixture, coating the surface of the at least one wall of the microchannel with the catalyst-solvent mixture, and drying the catalyst mixture to remove the solvent.

A seventh aspect of the present disclosure may include the sixth aspect, where the solvent may comprise $CH_3CN$.

An eighth aspect of the present disclosure may include any one of the first through seventh aspects, where the catalyst may be a composite catalyst comprising a catalyst support and the NHPI impregnated onto the catalyst support.

A ninth aspect of the present disclosure may include the eighth aspect, where the catalyst support may be silica, alumina, zeolite, zirconia, metal carbide, amorphous silica-alumina, active carbon, boron nitride, or any combination of these catalyst support materials.

A tenth aspect of the present disclosure may include either one of the eight or ninth aspects, where the catalyst support may comprise a plurality of support particles, and the NHPI may be impregnated onto each of the plurality of support particles.

An eleventh aspect of the present disclosure may include any one of the eighth through tenth aspects, where the catalyst comprising the catalyst support impregnated with the NHPI may be coated onto the surface of the at least one wall of the microchannel.

A twelfth aspect of the present disclosure may include any one of the first through eleventh aspects, further comprising a gas-liquid separator fluidly coupled to the microchannel outlet, wherein the separator may comprise a separator inlet, a gas outlet, and a liquid outlet.

A thirteenth aspect of the present disclosure may include the twelfth aspect, further comprising a reformed hydrocarbon fuel tank fluidly coupled to the liquid outlet of the gas-liquid separator.

A fourteenth aspect of the present disclosure may include any one of the first through thirteenth aspects, further comprising a reformed fuel recycle line fluidly coupled to the liquid outlet of the gas-liquid separator and the microstatic mixer inlet of the microstatic mixer.

A fifteenth aspect of the present disclosure may include the fourteenth aspect, where the reformed fuel recycle line may be operable to pass reformed hydrocarbon fuel from the gas-liquid separator back to the microstatic mixer.

A sixteenth aspect of the present disclosure may include any one of the first through fifteenth aspects, where the microchannel reactor may comprise a plurality of microchannels.

A seventeenth aspect of the present disclosure may include the sixteenth aspect, where the microchannel reactor may comprise a plurality of reactor plates stacked on top of another, where each reactor plate may comprise one of the plurality of microchannels.

An eighteenth aspect of the present disclosure may include either one of the sixteenth or seventeenth aspects, where two or more of the plurality of microchannels may be fluidly coupled together in series.

A nineteenth aspect of the present disclosure may include either one of the sixteenth or seventeenth aspects, where two or more of the plurality of microchannels may be operated in parallel.

A twentieth aspect of the present disclosure may include any one of the first through nineteenth aspects, further comprising a plurality of microstatic mixers and a fuel distributor fluidly coupled to the microstatic mixer inlet of each of the plurality of microstatic mixers.

A twenty-first aspect of the present disclosure may include the twentieth aspect, where the hydrocarbon fuel distributor may comprise one or a plurality of flow restrictors configured to divide the hydrocarbon fuel into a plurality of streams having equal flow rates.

A twenty-second aspect of the present disclosure may include any one of the first through twenty-first aspects, further comprising an oxygen-containing gas distributor fluidly coupled to the microstatic mixer inlets.

A twenty-third aspect of the present disclosure may include the twenty-second aspect, where the oxygen-containing gas distributor may comprise one or a plurality of flow restrictors configured to divide the oxygen containing gas into a plurality of streams having equal flow rates.

A twenty-fourth aspect of the present disclosure may include any one of the first through twenty-third aspects, where the heat transfer system may comprise one or more heating fluid conduits configured to pass a heating fluid through a housing of the microchannel reactor.

A twenty-fifth aspect of the present disclosure may include the twenty-fourth aspect, where the one or more heating fluid channels may be fluidly coupled to a heating fluid source.

A twenty-sixth aspect of the present disclosure may include the twenty-fifth aspect, where the heating fluid source may comprise engine exhaust gases or an engine coolant fluid.

A twenty-seventh aspect of the present disclosure may be directed to a process for increasing a cetane value of a hydrocarbon fuel. The process may comprise passing the hydrocarbon fuel and an oxygen-containing gas to a microstatic mixer that mixes the hydrocarbon fuel and the oxygen-containing gas to produce a combined stream and passing the combined stream to a microchannel reactor comprising a microchannel defined by at least one wall. The at least one wall may comprise a catalyst coated on a surface of the at least one wall, where the catalyst may comprise NHPI. The process may further include heating the microchannel to a reaction temperature and contacting the hydrocarbon fuel with the oxygen-containing gas in the presence of the catalyst in the microchannel at the reaction temperature. The contacting may cause at least a portion of hydrocarbons in the hydrocarbon fuel to react to produce a microchannel reactor effluent comprising a reformed hydrocarbon fuel having a cetane value greater than a cetane value of the hydrocarbon fuel upstream of the microchannel reactor.

A twenty-eighth aspect of the present disclosure may include the twenty-seventh aspect, further comprising separating the microchannel reactor effluent to produce a reformed hydrocarbon fuel and a gas stream comprising excess oxygen-containing gas.

A twenty-ninth aspect of the present disclosure may include either one of the twenty-seventh or twenty-eighth aspects, comprising contacting the hydrocarbon fuel with the oxygen-containing gas in the presence of the catalyst at the reaction temperature of from 25° C. to 150° C.

A thirtieth aspect of the present disclosure may include any one of the twenty-seventh through twenty-ninth aspects, comprising contacting the hydrocarbon fuel with the oxygen-containing gas in the presence of the catalyst at a reaction pressure of from ambient pressure to 1000 kilopascals pressure.

A thirty-first aspect of the present disclosure may include any one of the twenty-seventh through thirtieth aspects, comprising contacting the hydrocarbon fuel with the oxygen-containing gas in the presence of the catalyst for a reaction time in the microchannel of from 1 second to 24 hours.

A thirty-second aspect of the present disclosure may include any one of the twenty-seventh through thirty-first aspects, comprising passing the hydrocarbon fuel to the microstatic mixer at a liquid hourly space velocity of from 1 per hour to 100 per hour.

A thirty-third aspect of the present disclosure may include any one of the twenty-seventh through thirty-first aspects, comprising passing the oxygen-containing gas to the microstatic mixer at a gas hourly space velocity of from 100 per hour to 10,000 per hour.

A thirty-fourth aspect of the present disclosure may include any one of the twenty-seventh through thirty-third aspects, further comprising recycling the reformed hydrocarbon fuel back to the microstatic mixer.

It may be noted that one or more of the following claims utilize the terms "where," "wherein," or "in which" as transitional phrases. For the purposes of defining the present technology, it may be noted that these terms are introduced in the claims as an open-ended transitional phrase that are used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it may be noted that the various details described in this disclosure should not be taken to imply that these details relate to elements that are essential components of the various embodiments described in this disclosure, even in cases where a particular element may be illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

What is claimed is:

1. A system for reforming a liquid hydrocarbon fuel, the system comprising:
    a microchannel reactor comprising a microchannel, where the microchannel has a microchannel inlet, a microchannel outlet, at least one wall, and a catalyst deposited on the at least one wall of the microchannel, where:
        the at least one wall defines an interior cavity; and
        the catalyst comprises N-Hydroxyphthalimide (NHPI);
    a heat transfer system configured to actively transfer heat across the at least one wall of the microchannel; and
    a microstatic mixer upstream of the microchannel, where the microstatic mixer has a microstatic mixer inlet and microstatic mixer outlet, and where the microstatic mixer outlet is in fluid communication with the microchannel inlet and where the microstatic mixer inlet is fluidly coupled to a liquid hydrocarbon fuel source and an oxygen containing gas source.

2. The system of claim 1, where the microchannel has a length of from 0.05 meters to 50 meters.

3. The system of claim 1, where the microchannel has largest cross-sectional dimension of from 0.1 millimeters to 5 millimeters.

4. The system of claim 1, where the NHPI is deposited directly onto a surface of the at least one wall of the microchannel.

5. The system of claim 1, where the catalyst is a composite catalyst comprising a catalyst support and the NHPI impregnated onto the catalyst support.

6. The system of claim 5, where the catalyst support is silica, alumina, zeolite, zirconia, metal carbide, amorphous silica-alumina, active carbon, boron nitride, or any combination of these catalyst support materials.

7. The system of claim 5, where the catalyst comprising the catalyst support impregnated with the NHPI are coated onto the surface of the at least one wall of the microchannel.

8. The system of claim 1, further comprising:
a gas-liquid separator fluidly coupled to the microchannel outlet, wherein the gas-liquid separator comprises a separator inlet, a gas outlet, and a liquid outlet; and
a reformed liquid hydrocarbon fuel tank fluidly coupled to the liquid outlet of the gas-liquid separator.

9. The system of claim 8, further comprising a reformed fuel recycle line fluidly coupled to the liquid outlet of the gas-liquid separator and the microstatic mixer inlet of the microstatic mixer, where the reformed fuel recycle line is operable to pass the reformed liquid hydrocarbon fuel from the gas-liquid separator back to the microstatic mixer.

10. The system of claim 1, where the microchannel reactor comprises a plurality of microchannels.

11. The system of claim 10, where the microchannel reactor comprises a plurality of reactor plates stacked on top of another, where each reactor plate comprises one of the plurality of microchannels.

12. The system of claim 10, where two or more of the plurality of microchannels are fluidly coupled together in series.

13. The system of claim 10, where the two or more of the plurality of microchannels are operated in parallel.

14. The system of claim 13, further comprising:
a plurality of microstatic mixers; and
a fuel distributor fluidly coupled to the microstatic mixer inlet of each of the plurality of microstatic mixers.

15. The system of claim 14, further comprising an oxygen-containing gas distributor fluidly coupled to the microstatic mixer inlet of each of the plurality of microstatic mixers.

16. The system of claim 1, where the heat transfer system comprises one or more heating fluid conduits configured to pass a heating fluid through a housing of the microchannel reactor.

17. A process for increasing a cetane value of a liquid hydrocarbon fuel, the process comprising:
passing the liquid hydrocarbon fuel and an oxygen-containing gas to a microstatic mixer that mixes the liquid hydrocarbon fuel and the oxygen-containing gas to produce a combined stream, where the combined stream comprises a dispersion of the oxygen containing gas in the form of microbubbles dispersed in the liquid phase of the hydrocarbon fuel;
passing the combined stream to a microchannel reactor comprising a microchannel defined by at least one wall, where the at least one wall comprises a catalyst coated on a surface of the at least one wall, the catalyst comprising NHPI;
heating the microchannel to a reaction temperature;
contacting the liquid hydrocarbon fuel with the oxygen-containing gas in the presence of the catalyst in the microchannel at the reaction temperature, where the contacting causes at least a portion of hydrocarbons in the liquid hydrocarbon fuel to react to produce a microchannel reactor effluent comprising a reformed liquid hydrocarbon fuel having a cetane value greater than a cetane value of the liquid hydrocarbon fuel upstream of the microchannel reactor.

18. The process of claim 17, further comprising separating the microchannel reactor effluent to produce a reformed liquid hydrocarbon fuel and a gas stream comprising excess oxygen-containing gas.

19. The process of claim 17, comprising contacting the liquid hydrocarbon fuel with the oxygen-containing gas in the presence of the catalyst at the reaction temperature of from 25° C. to 150° C., at a reaction pressure of from ambient pressure to 1000 kilopascals pressure, and for a reaction time in the microchannel of from 1 second to 24 hours.

20. The process of claim 17, further comprising recycling the reformed liquid hydrocarbon fuel back to the microstatic mixer.

* * * * *